United States Patent
Shirotori et al.

(10) Patent No.: US 8,908,329 B2
(45) Date of Patent: Dec. 9, 2014

(54) MAGNETIC HEAD WITH BEVELED MAIN POLE AND SPIN TORQUE OSCILLATOR, METHOD OF MANUFACTURING THE SAME, AND MAGNETIC RECORDING/REPRODUCTION APPARATUS

(71) Applicant: Kabushiki Kaisha Toshiba, Tokyo (JP)

(72) Inventors: Satoshi Shirotori, Yokohama (JP); Katsuhiko Koui, Yokohama (JP); Shinobu Sugimura, Yokohama (JP); Norihito Fujita, Fuchu (JP); Akihiko Takeo, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/657,093

(22) Filed: Oct. 22, 2012

(65) Prior Publication Data
US 2014/0009853 A1  Jan. 9, 2014

(30) Foreign Application Priority Data

Jul. 6, 2012  (JP) .................................. 2012-152819

(51) Int. Cl.
*G11B 5/147* (2006.01)
*G11B 5/187* (2006.01)

(52) U.S. Cl.
USPC ............... 360/125.3; 360/125.03; 360/125.13

(58) Field of Classification Search
USPC ................. 360/125.3, 125.03, 125.12, 125.13
See application file for complete search history.

(56) References Cited

U.S. PATENT DOCUMENTS

| | | | |
|---|---|---|---|
| 6,754,053 B2 | 6/2004 | Yoshikawa et al. | |
| 7,639,452 B2 | 12/2009 | Mochizuki et al. | |
| 7,895,732 B2 | 3/2011 | Okada et al. | |
| 8,305,711 B2 * | 11/2012 | Li et al. .................... | 360/125.31 |
| 2009/0316304 A1 * | 12/2009 | Funayama et al. ......... | 360/234.3 |
| 2010/0007996 A1 | 1/2010 | Iwasaki et al. | |
| 2011/0090603 A1 | 4/2011 | Bai | |
| 2011/0128652 A1 * | 6/2011 | Taguchi et al. .......... | 360/123.12 |
| 2011/0273800 A1 * | 11/2011 | Takano et al. ............ | 360/125.12 |
| 2012/0134046 A1 * | 5/2012 | Matsumoto et al. ....... | 360/99.08 |
| 2013/0148242 A1 * | 6/2013 | Koui et al. ............... | 360/125.12 |
| 2013/0215532 A1 * | 8/2013 | Taguchi et al. .......... | 360/123.02 |

FOREIGN PATENT DOCUMENTS

| | | |
|---|---|---|
| JP | 3558996 | 5/2004 |
| JP | 2006-244671 | 9/2006 |
| JP | 2007-250074 | 9/2007 |
| JP | 2008-218829 | 9/2008 |
| JP | 2010-003351 | 1/2010 |
| JP | 2011-090767 | 5/2011 |
| JP | 4852330 | 10/2011 |

\* cited by examiner

*Primary Examiner* — Jefferson Evans
(74) *Attorney, Agent, or Firm* — Knobbe Martens Olson & Bear, LLP

(57) ABSTRACT

According to one embodiment, a magnetic head manufacturing method includes forming a protective layer on the surfaces of a main magnetic pole layer, a processed spin torque oscillator, and a mask formed on the spin torque oscillator, and further performing ion beam etching on the main magnetic pole layer and the protective layer on the surface of the main magnetic pole layer through the mask such that the protective layer is left behind on the side surfaces of the spin torque oscillator and removed from the surface of the main magnetic pole layer, thereby processing the main magnetic pole layer such that its side surfaces have a shape tapered toward the substrate.

11 Claims, 5 Drawing Sheets

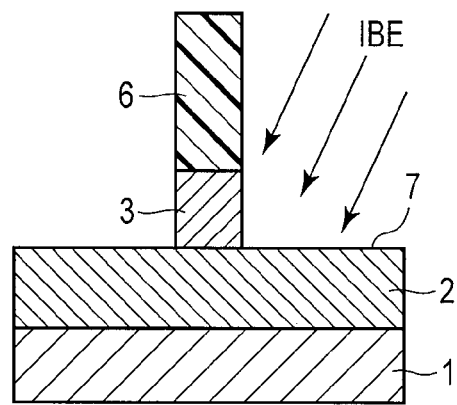
F I G. 3
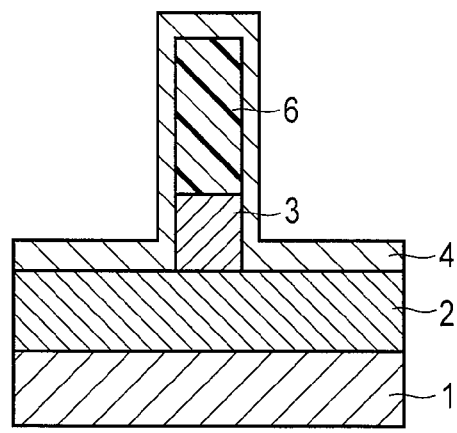
F I G. 4

MAGNETIC HEAD WITH BEVELED MAIN POLE AND SPIN TORQUE OSCILLATOR, METHOD OF MANUFACTURING THE SAME, AND MAGNETIC RECORDING/REPRODUCTION APPARATUS

CROSS-REFERENCE TO RELATED APPLICATIONS

This application is based upon and claims the benefit of priority from Japanese Patent Application No. 2012-152819, filed Jul. 6, 2012, the entire contents of which are incorporated herein by reference.

FIELD

Embodiments described herein relate generally to a high-frequency assisted magnetic recording head and a method of manufacturing the same.

BACKGROUND

There are conventional techniques in which a trapezoidal shape having a small width on the reading side is formed by giving a bevel angle to the air bearing surface shape of a main magnetic pole layer by taking account of a case in which a skew angle is produced in a recording head. Since, however, none of these techniques use any spin torque oscillator (STO), it is difficult to achieve a recording density of 1 Tbpsi or more.

Also, when an STO layer and the main magnetic pole layer are processed by using the same mask in order to form the STO of the magnetic recording head on the main magnetic pole, the STO and main magnetic pole are processed by the same angle. This makes it difficult to give a bevel angle to only the main magnetic pole. When processing the STO layer and main magnetic pole layer by the same angle, it is possible to give a bevel angle to the STO and main magnetic pole, or give no bevel angle to the STO and main magnetic pole. For example, when the STO had a bevel angle, the size of an oscillation layer became larger than that of a spin injection layer forming the STO, and the oscillation driving current density increased. To implement a high-frequency magnetic field assisted recording head, it is important to design and form an STO capable of stably oscillating with a low driving current. A maximum current density that can be supplied to the STO is $2 \times 10^8$ A/cm$^2$ when, e.g., the STO size is about 70 nm. If the current density is higher than that, the characteristics deteriorate due to, e.g., the heat generation and migration of the spin torque oscillator. On the other hand, when neither the STO nor the main magnetic pole has a bevel angle, data on an adjacent track is erased if a skew angle is produced in the magnetic recording head. Also, when the element size decreases as the density increases, magnetization directions in the element are readily matched, and this facilitates generating high-frequency oscillation. On the other hand, the element size approaches the mean free path of electrons, and this poses the problem of the scaling rule by which spin torque transfer in the STO is suppressed and the magnetic resistance change ratio decreases. There is a method by which the specular reflection effect is increased by forming an oxide or the like having magnetization on the sidewalls of the element, thereby relaxing the problem of the scaling rule caused by the mean free path of electrons. However, if an oxide or the like having magnetization is formed on the sidewalls of the oscillation layer of the STO, high-frequency oscillation from the oscillation layer is suppressed.

BRIEF DESCRIPTION OF THE DRAWINGS

FIG. 3 is a view for explaining the method of manufacturing the high-frequency assisted magnetic recording head according to the embodiment;

FIG. 4 is a view for explaining the method of manufacturing the high-frequency assisted magnetic recording head according to the embodiment;

DETAILED DESCRIPTION

Figure 1:
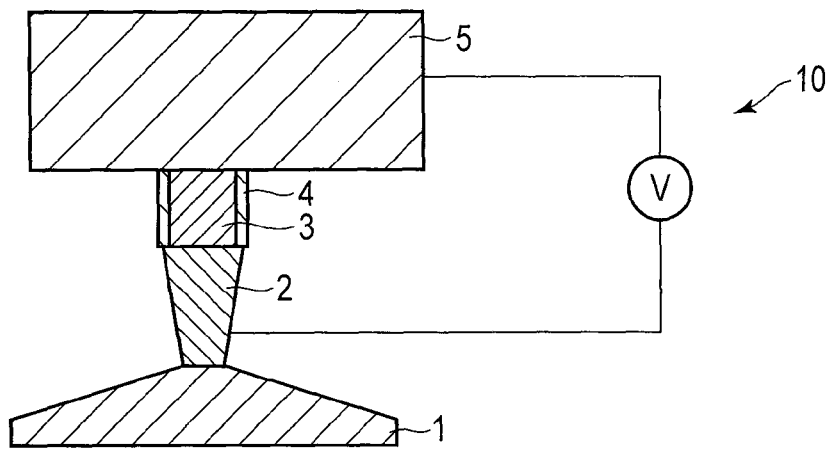
FIG. 1 is an exemplary view showing an arrangement in which a high-frequency assisted magnetic recording head according to an embodiment is viewed from the air bearing surface.

A magnetic head according to an embodiment includes a substrate, a main magnetic pole formed on the substrate, a write shield forming a magnetic circuit together with the main magnetic pole, and a spin torque oscillator formed between the main magnetic pole and write shield.

The side surfaces of the spin torque oscillator are covered with a protective layer.

When viewed from the air bearing surface side, the main magnetic pole has a shape tapered toward the substrate.

A width W1 of the boundary line between the main magnetic pole and spin torque oscillator is equal to or larger than a width W2 of the boundary line between the spin torque oscillator and write shield.

The magnetic head according to the embodiment can be manufactured by a method of manufacturing the magnetic head according to the embodiment.

The method of manufacturing the magnetic head according to the embodiment includes forming a main magnetic pole layer on a substrate, forming a spin torque oscillator layer on the main magnetic pole layer, forming a mask on the spin torque oscillator layer, processing the spin torque oscillator by performing ion beam etching on the spin torque oscillator layer through the mask, forming a protective layer on the surfaces of the main magnetic pole layer, the processed spin torque oscillator, and the mask formed on the spin torque oscillator, and further performing ion beam etching on the main magnetic pole layer and the protective layer on the surface of the main magnetic pole layer through the mask such that the protective layer is left behind on the side surfaces of the spin torque oscillator and removed from the surface of the main magnetic pole layer, thereby processing the main magnetic pole such that its side surfaces have a shape tapered toward the substrate.

In the embodiment, the side surfaces of the main magnetic pole have the shape tapered toward the substrate. Therefore, even when a skew angle is produced in the recording head, data on an adjacent track is not erased.

In the embodiment, the protective layer is formed on the spin torque oscillator before the main magnetic pole layer is processed by ion beam etching. This makes it possible to prevent the main magnetic pole layer material from scattering and adhering to the spin torque oscillator during ion beam etching. If no protective layer is formed, the main magnetic pole layer material often adheres to the spin torque oscillator and reduces the high-frequency oscillation of the spin torque oscillator.

The spin torque oscillator can include a spin injection layer, interlayer, and oscillation layer formed in order from the main magnetic pole layer to the write shield. Alternatively, when the main magnetic pole layer also serves as the spin injection layer, the spin torque oscillator can include an interlayer and oscillation layer.

In the embodiment, the protective layer is formed on the spin torque oscillator before the main magnetic pole layer is processed by ion beam etching. When the main magnetic pole layer is processed by ion beam etching, therefore, the spin torque oscillator is protected from the etching action and capable of holding the shape, so the shape of the spin torque oscillator is not a tapered shape like that of the main magnetic pole. That is, the width W1 of the boundary line between the main magnetic pole and spin torque oscillator is not smaller than the width W2 of the boundary line between the spin torque oscillator and write shield. Since this prevents the size of the oscillation layer from becoming larger than that of the spin injection layer, it is possible to keep a low oscillation driving current density and perform stable oscillation. If the size of the oscillation layer is larger than that of the spin injection layer, the oscillation driving current density often increases and makes oscillation unstable.

As the material of the protective layer, it is possible to use, e.g., an oxide or nitride of a nonmagnetic material selected from the group consisting of aluminum, silicon, tantalum, and titanium.

When the above-mentioned protective layer material is used in the embodiment, oxygen undesirable for the spin torque oscillator can be adsorbed. If oxygen exists, the crystal orientation of the spin torque oscillator deteriorates, and high-frequency oscillation often decreases.

Also, when the above-mentioned protective layer material is used in the embodiment, the specular reflection effect of the protective layer formed on the side surfaces of the spin torque oscillator is obtained. Since this prevents the attenuation of the mean free path of electrons and facilitates receiving spin torque, the high-frequency oscillation effect can be increased.

Thus, the embodiment can manufacture a high-frequency assisted magnetic recording head capable of stably oscillating a spin torque oscillator even on a main magnetic pole layer without erasing data on an adjacent track even if a skew angle is produced. This makes it possible to manufacture a reliable high-frequency assisted magnetic recording head and reliable magnetic recording/reproduction apparatus.

Note that the step of processing the main magnetic pole layer can be performed by, e.g., two stages.

In the first stage, ion beam etching is performed at a first beam angle on the main magnetic pole layer and the protective layer on the surface of the main magnetic pole layer through the mask, thereby processing the main magnetic pole such that the protective layer is left behind on the side surfaces of the spin torque oscillator, and removed from the surface of the main magnetic pole layer.

In the second stage, ion beam etching is further performed on the side surfaces of the processed main magnetic pole at a second beam angle different from the first beam angle, thereby processing the main magnetic pole so that its side surfaces have a shape tapered toward the substrate.

Assuming that the film surface is 90°, the first beam angle is 0° to less than 50°, and the second beam angle is 50° to 90°.

Furthermore, after the step of processing the main magnetic pole so as to give it the tapered shape, an insulating material or shield material can be buried on the side surfaces of the main magnetic pole and the surface of the protective layer between the substrate and write shield.

The embodiment will be explained in more detail below with reference to the accompanying drawings.

FIG. 1 is an exemplary view showing an arrangement in which the high-frequency assisted magnetic recording head according to the embodiment is viewed from the air bearing surface (ABS).

As shown in FIG. 1, a high-frequency assisted magnetic recording head 10 according to the embodiment includes a substrate 1, a main magnetic pole 2 whose air bearing surface (ABS) has a shape tapered toward the substrate, and an STO 3 formed on the main magnetic pole 2 and having a square or rectangular ABS shape. A protective layer 4 made of an oxide or nitride of a nonmagnetic material selected from Al, Si, Ta, and Ti is formed on the sidewalls of the STO 3. A write shield 5 is formed on the STO 3 and forms a magnetic circuit together with the main magnetic pole layer. Although the purpose of the protective layer 4 is the specular reflection effect, the protective layer 4 also has the oxygen adsorption effect. Therefore, the protective layer 4 has the effect of obtaining an STO having high crystal orientation by adsorbing oxygen in the STO. The substrate shown in FIG. 1 includes a reproduction element, shield material, and insulating material in some cases, but the substrate is not particularly limited in this embodiment.

FIGS. 2, 3, 4, 5, 6, and 7 are views for explaining a method of manufacturing the high-frequency assisted magnetic recording head according to the embodiment.

Figure 2:
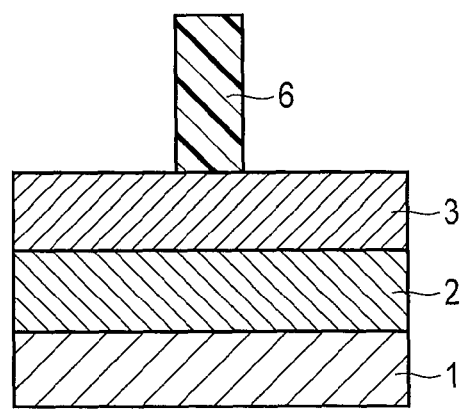
FIG. 2 is a view for explaining a method of manufacturing the high-frequency assisted magnetic recording head according to the embodiment.

As shown in FIG. 2, a main magnetic pole layer 2 is first deposited on a substrate 1. The main magnetic pole layer 2 is made of a soft magnetic material having a high Bs, e.g., an FeCo alloy. Then, an STO layer 3 is deposited.

Although not shown, the STO layer 3 includes a spin injection layer and oscillation layer formed on the main magnetic pole layer, an interlayer formed between the spin injection layer and oscillation layer, an underlayer formed between the spin injection layer and main magnetic pole layer, and a cap layer formed between the oscillation layer and a write shield 5.

As the oscillation layer, an FeCoAl alloy having magnetic anisotropy in the film in-plane direction can be used. It is also possible to use a material to which at least one of Si, Ge, Mn, Cr, and B is added. This makes it possible to adjust, e.g., the Bs, Hk (anisotropic magnetic field), and spin torque transfer efficiency between the oscillation layer and spin injection layer.

As the interlayer, a material having a high spin transmittance, e.g., Cu, Au, or Ag can be used. The film thickness of the interlayer can be one atomic layer to 3 nm. Consequently, the exchange coupling between the oscillation layer and spin injection layer can be adjusted to a favorable value.

As the spin injection layer, it is possible to use materials having high perpendicular orientation, e.g., CoCr-based magnetic layers having magnetization oriented in the direction perpendicular to the film surfaces such as CoCrPt, CoCrTa, CoCrTaPt, and CoCrTaNb, RE-TM-based amorphous alloy magnetic layers such as TbFeCo, Co artificial lattice magnetic layers such as Co/Pd, Co/Pt, and CoCrTa/Pd, CoPt-based and FePt-based alloy magnetic layers, and SmCo-based alloy magnetic layers; soft magnetic layers having a relatively high saturation magnetic flux density and magnetic anisotropy in the film in-plane direction such as CoFe, CoNiFe, NiFe, CoZrNb, FeN, FeSi, and FeAlSi; a Heusler alloy selected from the group consisting of, e.g., CoFeSi, CoMnSi, and CoMnAl; and a CoCr-based magnetic alloy film having magnetization oriented in the film in-plane direction. It is also possible to use a material obtained by stacking a plurality of materials described above. Furthermore, the above-mentioned main magnetic pole can also be used as the spin injection layer.

As the underlayer and cap layer, it is possible to use nonmagnetic metal materials having low electrical resistances, e.g., Ti, Cu, Ru, and Ta.

Subsequently, a mask for patterning the STO layer 3 and main magnetic pole layer 2 is formed. Although a photoresist or the like is used as the mask, it is also possible to use a hard mask made of, e.g., C, Si, Al, or an oxide or nitride of C, Si, or Al.

Then, as shown in FIG. 3, unmasked portions of the STO layer 3 are removed by using IBE. Assuming that a film surface 7 is 90°, a structure having no bevel angle can be obtained by inclining the beam angle through 0° to 70° C. Generally, the amount of redeposited product increases when the beam is inclined in the 0° direction, and side etching progresses when the beam is inclined in the 70° direction. Accordingly, etching can be performed at 50°.

Subsequently, as shown in FIG. 4, a protective layer 4 is formed on the surface of the patterned STO layer 3 and on the surface of the main magnetic pole layer 2 exposed by the patterning of the STO layer 3. As described above, an oxide or nitride of a nonmagnetic material selected from Al, Si, Ta, and Ti can be used as the protective layer 4. Since the protective layer 4 is formed, the untapered shape of the STO layer 3 can be held when tapering the main magnetic pole layer 2 so as to give it a bevel angle. Therefore, an oxide or nitride of Al, Ta, or Ti having an IBE resistance can be used as the protective layer 4. Also, the film thickness of the protective layer can be 3 to 20 nm. If the film thickness is less than 3 nm, side etching progresses in the main magnetic pole layer pattern formation step, and the function as the STO protective layer often disappears. If the film thickness exceeds 20 nm, it often becomes difficult to adjust the width of the main magnetic pole layer in the main magnetic pole layer pattern formation step. The protective layer 4 can be deposited as an oxide or nitride. Alternatively, after Al, Si, Ta, or Ti is deposited, the material can be oxidized or nitrided by performing plasma processing using oxygen gas or nitrogen gas. Furthermore, the oscillation of the STO was significantly suppressed when redeposition of the main magnetic pole layer material mainly containing FeCo having a high Bs (saturation magnetic flux density) occurred on the sidewalls of the STO. When the redeposited product was completely removed by IBE, damage to the STO layer and shape deterioration of the STO were significant. The above-mentioned STO protective layer has the effect of protecting the redeposition of the main magnetic pole layer material to the STO sidewalls when forming the main magnetic pole layer, in addition to the specular reflection effect mentioned earlier.

Figure 5:
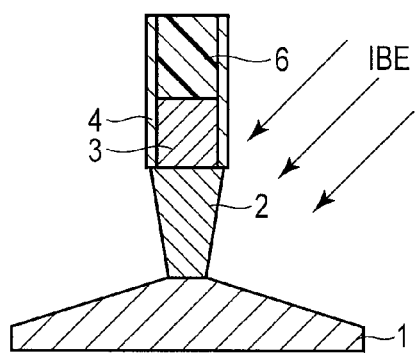
FIG. 5 is a view for explaining the method of manufacturing the high-frequency assisted magnetic recording head according to the embodiment.

Then, as shown in FIG. 5, a main magnetic pole layer is formed by using IBE. Since the main magnetic pole layer corresponds to the skew angle of the head, the main magnetic pole layer is tapered so as to have a bevel angle. After the main magnetic pole layer except for the mask portion is removed to the substrate by setting the beam angle at 0° to 50° with respect to 90° of the film surface, and then the beam angle is set at 50° to 90°. This makes it possible to adjust the bevel angle such that the side surfaces have a shape tapered toward the substrate when viewed from the ABS side.

Figure 6:
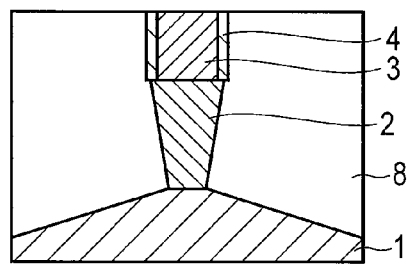
FIG. 6 is a view for explaining the method of manufacturing the high-frequency assisted magnetic recording head according to the embodiment.

As shown in FIG. 6, the STO and main magnetic pole layer are buried, and a planarization process is performed.

As a filling material 8, an insulating oxide such as $SiO_2$ or $Al_2O_3$ can be used. It is also possible to form a side shield by using a shield material such as FeCoNi. Although CMP (Chemical Mechanical Polishing) can be used as the planarization process, planarization may also be performed using ion beam etching.

Figure 7:
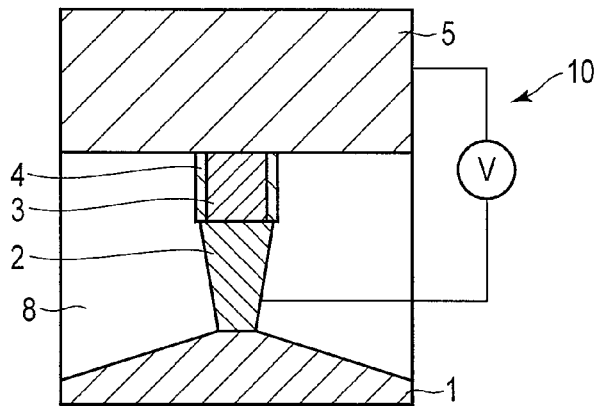
FIG. 7 is a view for explaining the method of manufacturing the high-frequency assisted magnetic recording head according to the embodiment.

Finally, as shown in FIG. 7, FeCoNi or the like is deposited as a write shield 5.

Thus, the high-frequency assisted magnetic recording head 10 according to the embodiment is obtained.

The high-frequency assisted magnetic recording head manufacturing method has been explained above. However, the embodiment is not limited to the numerical values and materials described above, and it is also possible to use other numerical values and materials.

Figure 8:
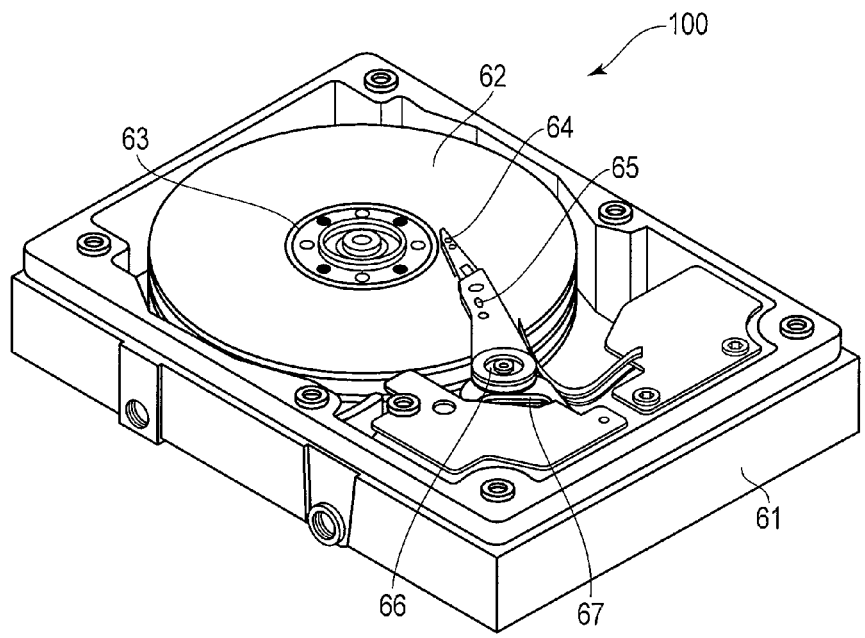
FIG. 8 is a partially exploded perspective view showing an example of a magnetic recording/reproduction apparatus according to the embodiment.

FIG. 8 is a partially exploded perspective view showing an example of a magnetic recording/reproduction apparatus according to the embodiment.

The magnetic recording/reproduction apparatus according to the embodiment includes the above-described magnetic head and a perpendicular magnetic recording medium.

In a magnetic recording/reproduction apparatus 100 according to the embodiment, a rigid magnetic disk 62 for recording information is fitted on a spindle 63 and rotated at a predetermined rotational speed by a spindle motor (not shown). A slider 64 on which the recording head according to the embodiment which records information by accessing the magnetic disk 62 and an MR head for reproducing information are mounted is attached to the distal end of a suspension 65 formed by a thin leaf spring. The suspension 65 is connected to one end of an arm 66 including a bobbin for holding a driving coil (not shown).

A voice coil motor 67 as a kind of a linear motor is formed at the other end of the arm 66. The voice coil motor 67 includes the driving coil (not shown) wound on the bobbin of the arm 66, and a magnetic circuit including a permanent magnet and counter yoke arranged to oppose each other so as to sandwich the driving coil.

The arm 66 is held by ball bearings (not shown) formed in two, upper and lower portions of a fixed shaft, and rotated by the voice coil motor 67. That is, the voice coil motor 67 controls the position of the slider 64 on the magnetic disk 62. Note that reference numeral 61 in FIG. 8 denotes a housing.

EXAMPLES

Example 1

A high-frequency assisted magnetic recording head was manufactured by using the method shown in FIGS. 2, 3, 4, 5, 6, and 7.

The STO and main magnetic pole pattern formation conditions will be described below.

First, a hard mask including 200-nm thick C and 10-nm thick Si was used as a mask for obtaining an STO and main magnetic pole. The hard mask was transferred by forming a pattern by using a photoresist, processing the Si layer based on the pattern by RIE using $CF_4$ gas, and processing the C layer by RIE using oxygen gas by using the Si layer as a mask.

Then, an STO was formed by using IBE. This IBE of the STO layer was performed at an acceleration voltage of 300 V and a beam angle of 50°, and etching was continued until an underlayer of the STO was detected by using an SIMS (Secondary Ion-microprobe Mass Spectrometer). After that, 10-nm thick $AlO_x$ serving as a protective layer was deposited by using ALD (Atomic Layer Deposition).

In addition, a main magnetic pole layer was formed by using IBE. This IBE of the main magnetic pole layer was repetitively performed by alternately switching beam angles of 50° and 80° at an acceleration voltage of 300 V, thereby forming a main magnetic pole layer shape having a bevel angle. After that, the C hard mask was removed by RIE using oxygen gas. This RIE was performed at an antenna power of 100 W and a bias power of 100 W. Furthermore, a side gap film made of $Al_2O_3$ and an Ru underlayer for plating were deposited by sputtering, a side shield film was deposited by plating, and a planarization process was performed using CMP. After that, FeCoNi was formed as a write shield, thereby obtaining a magnetic recording head.

The R-Iw (resistance-recording current) characteristic of the obtained magnetic recording head was checked by applying a recording current while changing the driving current density of the STO by using a spinstand.

Figure 9:
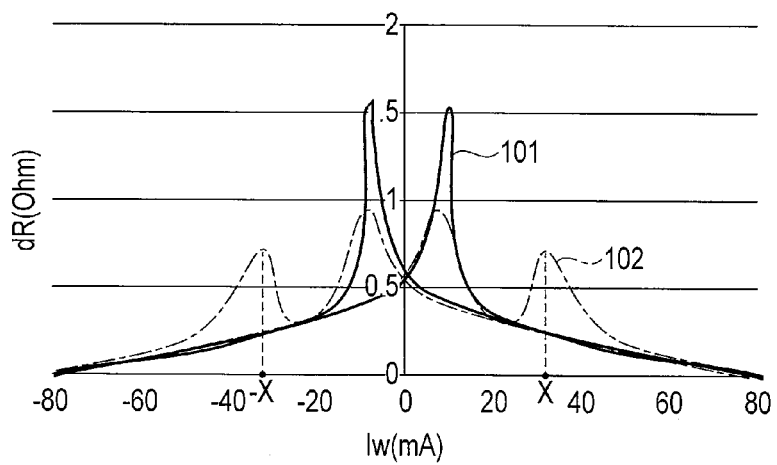
FIG. 9 is a graph showing the R-Iw (resistance-recording current) characteristics.

FIG. 9 is a graph showing the R-Iw (resistance-recording current) characteristics.

Referring to FIG. 9, a curve 101 indicates the characteristic when STO driving current density $Ib=5.0\times10^6$ $A/cm^2$, and a curve 102 indicates the characteristic when $Ib=7.2\times10^7$ $A/cm^2$.

When $Ib=7.2\times10^7$ $A/cm^2$ in FIG. 9, a resistance rise resulting from high-frequency oscillation was found in positions at which $Iw=-X$ (mA) and $Iw=X$ (mA) where X is about 30 mA.

Also, in recording and reproduction on inner tracks where a skew angle is produced in the head, neither erase nor attenuation of data on adjacent tracks was found. Table 1 (to be presented later) shows the obtained results. From the foregoing, high-frequency oscillation was obtained with a low driving current without deteriorating the fringe characteristic.

Example 2

A magnetic recording head was manufactured following the same procedures as in Example 1 except that $SiO_x$ was used as the protective layer. When the R-Iw characteristic of the obtained magnetic recording head was checked, a resistance rise resulting from high-frequency oscillation was found when $Ib=8.0\times10^7$ $A/cm^2$ similar to that in Example 1. Also, in recording and reproduction on inner tracks where a skew angle is produced in the head, neither erase nor attenuation of data on adjacent tracks was found. Table 1 (to be presented later) shows the obtained results.

Example 3

A magnetic recording head was manufactured following the same procedures as in Example 1 except that $TaO_x$ was used as the protective layer.

When the R-Iw characteristic of the obtained magnetic recording head was checked, a resistance rise resulting from high-frequency oscillation was found when $Ib=7.0\times10^7$ $A/cm^2$ similar to that in Example 1. Also, in recording and reproduction on inner tracks where a skew angle is produced in the head, neither erase nor attenuation of data on adjacent tracks was found. Table 1 (to be presented later) shows the obtained results.

Example 4

A magnetic recording head was manufactured following the same procedures as in Example 1 except that $TiO_x$ was used as the protective layer. When the R-Iw characteristic of the obtained magnetic recording head was checked, a resistance rise resulting from high-frequency oscillation was found when $Ib=7.3\times10^7$ $A/cm^2$ similar to that in Example 1. Also, in recording and reproduction on inner tracks where a skew angle is produced in the head, neither erase nor attenuation of data on adjacent tracks was found. Table 1 (to be presented later) shows the obtained results.

Example 5

A magnetic recording head was manufactured following the same procedures as in Example 1 except that $AlN_x$ was used as the protective layer. When the R-Iw characteristic of the obtained magnetic recording head was checked, a resistance rise resulting from high-frequency oscillation was found when $Ib=7.5\times10^7$ $A/cm^2$ similar to that in Example 1. Also, in recording and reproduction on inner tracks where a skew angle is produced in the head, neither erase nor attenuation of data on adjacent tracks was found. Table 1 (to be presented later) shows the obtained results.

Example 6

A magnetic recording head was manufactured following the same procedures as in Example 1 except that $SiN_x$ was used as the protective layer. When the R-Iw characteristic of the obtained magnetic recording head was checked, a resistance rise resulting from high-frequency oscillation was found when $Ib=8.2\times10^7$ $A/cm^2$ similar to that in Example 1. Also, in recording and reproduction on inner tracks where a skew angle is produced in the head, neither erase nor attenuation of data on adjacent tracks was found. Table 1 (to be presented later) shows the obtained results.

Example 7

A magnetic recording head was manufactured following the same procedures as in Example 1 except that $TaN_x$ was used as the protective layer. When the R-Iw characteristic of the obtained magnetic recording head was checked, a resistance rise resulting from high-frequency oscillation was found when $Ib=7.8\times10^7$ $A/cm^2$ similar to that in Example 1. Also, in recording and reproduction on inner tracks where a skew angle is produced in the head, neither erase nor attenuation of data on adjacent tracks was found. Table 1 (to be presented later) shows the obtained results.

Example 8

A magnetic recording head was manufactured following the same procedures as in Example 1 except that $TiN_x$ was used as the protective layer. When the R-Iw characteristic of the obtained magnetic recording head was checked, a resistance rise resulting from high-frequency oscillation was found when $Ib=8.0\times10^7$ $A/cm^2$ similar to that in Example 1. Also, in recording and reproduction on inner tracks where a skew angle is produced in the head, neither erase nor attenuation of data on adjacent tracks was found. Table 1 (to be presented later) shows the obtained results.

Example 9

Figure 10:
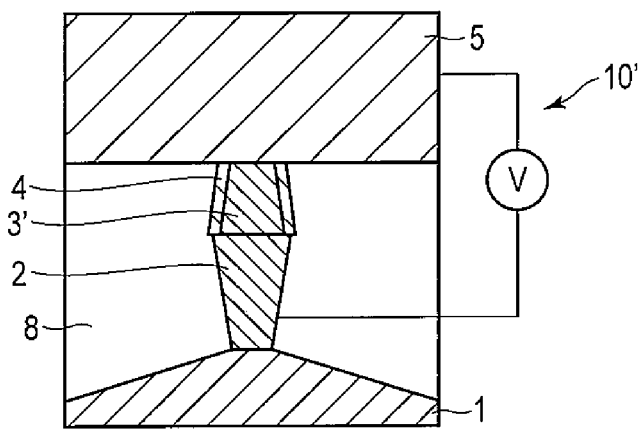
FIG. 10 is an exemplary view showing an arrangement in which a high-frequency assisted magnetic recording head according to Example 9 is viewed from the air bearing surface.

As shown in FIG. 10, a magnetic recording head 10' was manufactured following the same procedures as in Example 1 except that the STO 3' was formed to have a shape tapered in a direction opposite to that of the main magnetic pole, i.e., a shape tapered toward the write shield.

The inverse tapered shape was obtained by performing IBE of the STO layer at an acceleration voltage of 300 V and a beam angle of 10°. When the R-Iw characteristic of the obtained magnetic recording head was checked, a resistance rise resulting from high-frequency oscillation was found when Ib=6.4×10$^7$ A/cm$^2$ similar to that in Example 1. Also, in recording and reproduction on inner tracks where a skew angle is produced in the head, neither erase nor attenuation of data on adjacent tracks was found. Table 1 (to be presented later) shows the obtained results.

Comparative Example 1

A high-frequency assisted magnetic recording head was manufactured following the same procedures as in Example 1, except that no protective layer was used and the STO and main magnetic pole were formed at the same bevel angle having a taper in the direction of the substrate. The shape of the STO layer and main magnetic pole layer was obtained by repetitively performing IBE by alternately switching beam angles of 50° and 80° at an acceleration voltage of 300 V. When the R-Iw characteristic of the obtained magnetic recording head was checked, a resistance rise resulting from high-frequency oscillation was found when Ib=2.1×10$^8$ A/cm$^2$, i.e., the current density was higher than that in Example 1. The possible cause was the influence of damage to the STO sidewalls, i.e., the influence of redeposition of the main magnetic pole material and processing damage by side trimming. Also, the oscillation start current density rose presumably because the STO also had a bevel angle, so the size of the oscillation layer was larger than that of the oscillation layer when the STO had no bevel angle (Comparative Example 2).

Comparative Example 2

A high-frequency assisted magnetic recording head was manufactured following the same procedures as in Example 1, except that no protective layer was used and the STO and main magnetic pole were formed so as not to have any tapered shape. The shape of the STO layer and main magnetic pole layer was obtained by performing IBE at an acceleration voltage of 300 V and a beam angle of 50°. When the R-Iw characteristic of the obtained magnetic recording head was checked, a resistance rise resulting from high-frequency oscillation was found when Ib=1.3×10$^8$ A/cm$^2$, i.e., the current density was higher than that in Example 1. The possible cause was the influence of damage to the STO sidewalls (the influence of redeposition of the main magnetic pole material and processing damage by side trimming). Also, since the main magnetic pole had no bevel angle, data on adjacent tracks were erased in recording and reproduction on inner tracks where a skew angle is produced in the head. Table 1 (to be presented later) shows the obtained results.

Comparative Example 3

A high-frequency assisted magnetic recording head was manufactured following the same procedures as in Example 1 except that FeCo was used as the STO protective layer. When the R-Iw characteristic of the obtained magnetic recording head was checked, no resistance rise (high-frequency oscillation) resulting from high-frequency oscillation was found even when an electric current was supplied to 3.0×10$^8$ A/cm$^2$. This was so probably because FeCo was the same high-Bs material as the main magnetic pole layer material, so the oscillation of the STO was suppressed when the high-Bs material was deposited on the STO sidewalls.

TABLE 1

|  | STO protective layer/ STO shape/main magnetic pole shape | Oscillation start current density (A/cm$^2$) | Data erase on adjacent tracks |
| --- | --- | --- | --- |
| Example 1 | AlOx/steep/taper | 7.2 × 10$^7$ | Not found |
| Example 2 | SiOx/steep/taper | 8.0 × 10$^7$ | Not found |
| Example 3 | TaOx/steep/taper | 7.0 × 10$^7$ | Not found |
| Example 4 | TiOx/steep/taper | 7.3 × 10$^7$ | Not found |
| Example 5 | AlNx/steep/taper | 7.5 × 10$^7$ | Not found |
| Example 6 | SiNx/steep/taper | 8.2 × 10$^7$ | Not found |
| Example 7 | TaNx/steep/taper | 7.8 × 10$^7$ | Not found |
| Example 8 | TiNx/steep/taper | 8.0 × 10$^7$ | Not found |
| Example 9 | AlOx/reverse taper/taper | 6.4 × 10$^7$ | Not found |
| Comparative Example 1 | Non/taper/taper | 2.1 × 10$^8$ | Not found |
| Comparative Example 2 | Non/steep/steep | 1.3 × 10$^8$ | Found |
| Comparative Example 3 | FeCoOx/steep/taper | No oscillation | Not found |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head manufacturing method comprising:
    forming a main magnetic pole layer on a substrate;
    forming a spin torque oscillator on the main magnetic pole layer;
    forming a mask on the spin torque oscillator;
    processing the spin torque oscillator by performing ion beam etching on the spin torque oscillator through the mask to make a shape tapered in a direction opposite to the main magnetic pole when viewed from an air bearing surface side;
    forming a protective layer on surfaces of the main magnetic pole layer, the processed spin torque oscillator, and the mask formed on the spin torque oscillator;
    further performing ion beam etching on the main magnetic pole layer and the protective layer on the surface of the main magnetic pole layer through the mask such that the protective layer is left behind on side surfaces of the spin torque oscillator and removed from the surface of the main magnetic pole layer, thereby processing the main magnetic pole layer such that side surfaces thereof have a shape tapered toward the substrate;
    filling an insulating material on the side surface of the main magnetic pole, the surface of the protective layer, and the surface of the substrate; and
    forming a write shield on the spin torque oscillator, wherein a width W1 of a boundary line between the main magnetic pole and the spin torque oscillator is larger than a width W2 of a boundary line between the spin torque oscillator and the write shield.

2. The method according to claim 1, wherein the processing the main magnetic pole layer comprises:
performing ion beam etching at a first beam angle on the main magnetic pole layer and the protective layer on the surface of the main magnetic pole layer through the mask, thereby processing the main magnetic pole layer such that the protective layer is left behind on the side surfaces of the spin torque oscillator and removed from the surface of the main magnetic pole layer; and
performing ion beam etching on the side surfaces of the processed main magnetic pole layer at a second beam angle different from the first beam angle, thereby processing the main magnetic pole layer such that the side surfaces have the shape tapered toward the substrate.

3. The method according to claim 2, wherein assuming that a film surface is 90°, the first beam angle is 0° to less than 50°, and the second beam angle is 50° to 90°.

4. The method according to claim 1, wherein an oxide or nitride of a nonmagnetic material selected from the group consisting of aluminum, silicon, tantalum, and titanium is used as the protective layer.

5. The method according to claim 1, wherein the spin torque oscillator includes a spin injection layer, an interlayer, and an oscillation layer formed in order on the main magnetic pole.

6. A magnetic head comprising:
a substrate;
a main magnetic pole formed on the substrate;
a write shield forming a magnetic circuit together with the main magnetic pole;
a spin torque oscillator formed between the main magnetic pole and the write shield;
a protective layer formed to cover side surfaces of the spin torque oscillator; and
an insulating material which is buried on side surfaces of the main magnetic pole and a surface of the protective layer between the substrate and the write shield,
wherein the main magnetic pole has a shape tapered toward the substrate, and the spin torque oscillator has a shape tapered in a direction opposite to that of the main magnetic pole when viewed from an air bearing surface side, and a width W1 of a boundary line between the main magnetic pole and the spin torque oscillator is larger than a width W2 of a boundary line between the spin torque oscillator and the write shield.

7. The head according to claim 6, wherein an oxide or a nitride of a nonmagnetic material selected from the group consisting of aluminum, silicon, tantalum, and titanium is used as the protective layer.

8. The head according to claim 6, wherein the spin torque oscillator includes a spin injection layer, an interlayer, and an oscillation layer formed in order from the main magnetic pole layer to the write shield.

9. A magnetic recording/reproduction apparatus comprising:
a magnetic recording medium; and
a magnetic head including:
a substrate,
a main magnetic pole formed on the substrate,
a write shield forming a magnetic circuit together with the main magnetic pole,
a spin torque oscillator formed between the main magnetic pole and the write shield,
a protective layer formed to cover side surfaces of the spin torque oscillator; and
an insulating material which is buried on side surfaces of the main magnetic pole and a surface of the protective layer between the substrate and the write shield,
wherein the main magnetic pole has a shape tapered toward the substrate, and the spin torque oscillator has a shape tapered in a direction opposite to that of the main magnetic pole when viewed from an air bearing surface side, and a width W1 of a boundary line between the main magnetic pole and the spin torque oscillator is larger than a width W2 of a boundary line between the spin torque oscillator and the write shield.

10. The apparatus according to claim 9, wherein an oxide or a nitride of a nonmagnetic material selected from the group consisting of aluminum, silicon, tantalum, and titanium is used as the protective layer.

11. The apparatus according to claim 9, wherein the spin torque oscillator includes a spin injection layer, an interlayer, and an oscillation layer formed in order from the main magnetic pole layer to the write shield.

* * * * *